United States Patent Office 3,734,970
Patented May 22, 1973

---

3,734,970
PREPARATION OF METHYL-β-PHENYL-ETHYL-ETHER
Yogesh Chand Chaturvedi, Lashkar, India (Government College of Science, Raipur, Madhya Pradesh, India)
No Drawing. Filed Sept. 21, 1970, Ser. No. 74,225
Int. Cl. C07c 41/04
U.S. Cl. 260—611 A        3 Claims

ABSTRACT OF THE DISCLOSURE

Methyl-β-phenyl-ethyl-ether is prepared by treating aluminium-β-phenyl-ethoxide with dimethylsulphate at water bath temperature. The unreacted dimethyl sulphate is destroyed by boiling with caustic soda solution and the lighter layer containing methyl-β-phenyl-ether is separated by fractionation. The aluminium-β-phenyl-ethoxide is prepared by treating β-phenyl-ethyl-alcohol with Al/Hg couple in the presence of carbon tetrachloride.

---

This invention relates to the preparation of methyl-β-phenyl-ethyl-ether, a substance which imparts an attractive fragrance to the essential oil extracted from the flowers of "Kewda" (*Pandanus-odoratissimus*).

According to this invention, methyl-β-phenyl-ethyl-ether is prepared by action of dimethyl sulphate on aluminium-β-phenyl ethoxide at water-bath temperature; i.e. at a temperature not exceeding 100° C.

In carrying out this invention into practice, β-phenyl-ethyl alcohol is treated with Al-Hg couple, in the presence of carbon tetrachloride as a catalyst, in order to produce aluminium-β-phenyl-ethoxide in the first instance, and the latter is then treated with dimethyl sulphate to produce methyl-β-phenyl-ethyl-ether.

The reactions above referred to may be represented as follows:

(a) 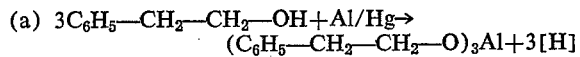

(b) 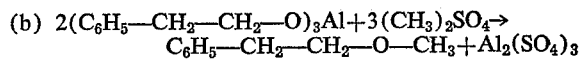

The above reactions are to be carried out in total absence of water or moisture.

The following example illustrates the experimental details of carrying out this invention into practice.

EXAMPLE (a) Preparation of Al/Hg couple

Aluminium turnings were treated with saturated $HgCl_2$ solution (for about two minutes), till a shining thin mercury coating was deposited all round the turnings. Excess $HgCl_2$ solution was decanted off, followed by successive rinsings of the couple with alcohol and ether respectively.

(b) Preparation of aluminium-β-phenylethoxide 24.4 gms. (1 mole) β-phenylethyl alcohol was dissolved in 120 ml. dry ether in a 500 ml. round bottomed flask fitted with reflux condenser and a $CaCl_2$ guard tube.
1.8 gms. (1/3 atom) aluminium in the form of Al/Hg couple along with 2 ml. $CCl_4$ as catalyst was added to the above ether solution by momentarily removing the condenser. The reaction started vigorously at room temperature and the contents were left overnight (12 hours) when all aluminium went into solution.

(c) Dimethylsulphate treatment

Aluminium β-phenylethoxide obtained in (b) was freed from ether by distilling off the latter and the ether free ethoxide was heated with 14 gms. of dimethylsulphate on water bath for five hours. Unreacted dimethylsulphate was destroyed with 20% boiling caustic soda solution (excess).

Two layers were formed and the lighter one consisting of methyl-β-phenyl-ethyl-ether was removed with the help of separating funnel, washed with water, dried over quicklime and fractionated.

Fraction boiling at 175°–185° C. contains mainly (methyl-β-phenylethylether), weighing 17 gms. (62%), was collected.

Further purification of the product thus obtained may be effected by fractional distillation under reduced pressure.

What I claim is:
1. A method of preparing methyl-β-phenyl-ethyl-ether which consists in reacting aluminium-β-phenyl-ethoxide with dimethylsulphate at a temperature not exceeding 100° C. and separating the product.
2. A method as claimed in claim 1, wherein the unreacted dimethyl sulphate is destroyed by boiling with caustic soda solution and the lighter layer containing methyl-β-phenyl-ethyl-ether is separated by distillation.
3. A method as claimed in claim 1, wherein aluminium-β-phenyl-ethoxide is prepared by the reaction of β-phenyl-ethyl-alcohol with Al/Hg couple in the presence of carbon tetrachloride as catalyst.

References Cited

UNITED STATES PATENTS

| | | | |
|---|---|---|---|
| 1,999,315 | 4/1935 | Baldwin et al. | 260—611 A |
| 2,847,477 | 8/1958 | Watanabe et al. | 260—611 A |
| 2,847,478 | 8/1958 | Hwa et al. | 260—611 A |
| 2,863,925 | 12/1958 | Starcher | 260—611 A |

OTHER REFERENCES

Wagner et al., Synthetic Org. Chem. (1953), pp. 228–229.

BERNARD HELFIN, Primary Examiner

U.S. Cl. X.R.
260—448 AD